(12) United States Patent
Ariga (10) Patent No.: US 7,623,180 B2
(45) Date of Patent: Nov. 24, 2009

(54) IMAGE PICKUP APPARATUS HAVING COMPACT, LIGHT WEIGHT, RIGID INTERNAL CHASSIS

(75) Inventor: Kazuto Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 675 days.

(21) Appl. No.: 10/807,177

(22) Filed: Mar. 24, 2004

(65) Prior Publication Data

US 2004/0212727 A1 Oct. 28, 2004

(30) Foreign Application Priority Data

Apr. 23, 2003 (JP) .............................. 2003-118386

(51) Int. Cl.
*H04N 5/225* (2006.01)
(52) U.S. Cl. .................. 348/373; 348/333.01; 348/335; 348/231.7
(58) Field of Classification Search ... 348/231.7–231.8, 348/372–374, 333.01, 335
See application file for complete search history.

(56) References Cited

U.S. PATENT DOCUMENTS

| | | | |
|---|---|---|---|
| 6,404,981 B1 * | 6/2002 | Kumagai et al. | 386/125 |
| 6,590,614 B1 * | 7/2003 | Nishio et al. | 348/374 |
| 6,956,613 B2 * | 10/2005 | Fujisawa | 348/372 |
| 7,079,185 B2 * | 7/2006 | Koyama et al. | 348/335 |
| 7,116,363 B2 * | 10/2006 | Fuchimukai | 348/231.8 |
| 2002/0031347 A1 * | 3/2002 | Fukuda | 396/358 |
| 2005/0088527 A1 * | 4/2005 | Silverbrook | 348/207.2 |

OTHER PUBLICATIONS

U.S. Appl. No. 10/724,601, filed Dec. 2, 2003, K. Ariga.

* cited by examiner

*Primary Examiner*—Lin Ye
*Assistant Examiner*—Gevell Selby
(74) *Attorney, Agent, or Firm*—Fitzpatrick, Cella, Harper & Scinto

(57) ABSTRACT

An image pickup apparatus having large rigidity, even if a thin steel plate is used for a main chassis, includes a solid-state image pickup device for converting an object image into an electric signal, a chassis, and a protective housing (armor). The chassis includes a plurality of stepwise bent portions. The bent portions positioned at opposing ends of the chassis are fixed at both ends of the image pickup apparatus in a state contacting the protective housing (armor).

4 Claims, 11 Drawing Sheets

IMAGE PICKUP APPARATUS HAVING COMPACT, LIGHT WEIGHT, RIGID INTERNAL CHASSIS

BACKGROUND OF THE INVENTION

1. Field of the Invention

The present invention relates to the rigidity of a housing obtained by controlling the shape of a main chassis, serving as an internal structure, of a digital still-image camera (hereinafter abbreviated as a "digital camera").

2. Description of the Related Art

Recently, in image pickup apparatuses, such as digital cameras or the like, that use recording media, it has become desirable intended to realize a low running cost caused by a recording/reproducing function, and a small and light apparatus. A recording-medium accommodating unit of a conventional digital camera will now be described with reference to FIG. 7.

Figure 7:
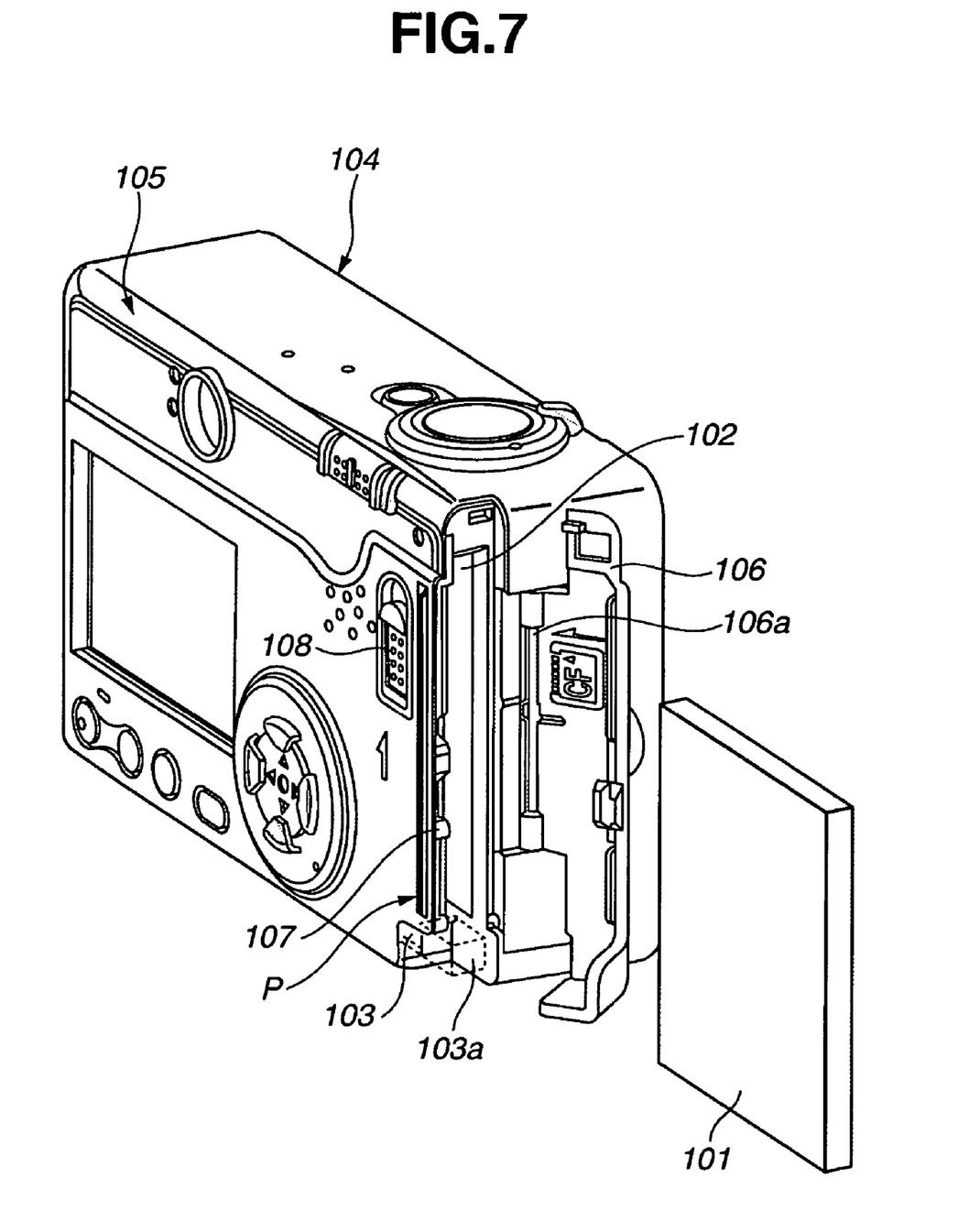
FIG. 7 is a schematic perspective view illustrating a conventional digital camera.

FIG. 7 is a schematic perspective view illustrating a portion near a recording-medium accommodating unit of a conventional digital camera. This digital camera generally includes a solid-state image pickup device, image pickup means including a lens, a signal processing unit, a power supply circuit unit, and a battery accommodating unit.

In particular, FIG. 7 illustrates a compact-flash card (registered trade name; hereinafter abbreviated as a "CF card") 101, serving as a recording medium for recording data of an object image or the like converted into an electrical signal by the solid-state image pickup device, a CF-card slot 102, serving as an accommodating portion for the CF card 101, an ejection button 103 provided at the CF-card slot 102 for taking the CF card 101 out of the camera, a front cover 104, serving as a camera-front-surface protective housing, a rear cover 105, serving as a camera-rear-surface protective housing, a CF-card cover 106 rotatably supported on the main body of the camera by a rotation shaft 106a, a rear inner member 107 made of resin and bonded to the rear cover 105, disposed between the rear cover 105 and the CF-card slot 102, and a slide button 108 fixed to the rear inner member 107 by a patching structure (not shown) so as to be vertically movable, and biased in a downward direction by an urging spring (not shown).

When a user desires to take the CF card 101 out of the camera, the user opens the CF-card cover 106 from a closed state by manually moving the slide button 108 upward against the bias force of the urging spring into to provide a state shown in FIG. 7. In this state, the ejection button 103 is extended at a position indicated by broken lines 103a. By manually pushing the ejection button 103 toward the interior of the camera, the CF card 101 is partially ejected from the camera CF slot 102, and the CF card 101 can be taken out of the camera.

Figure 8:
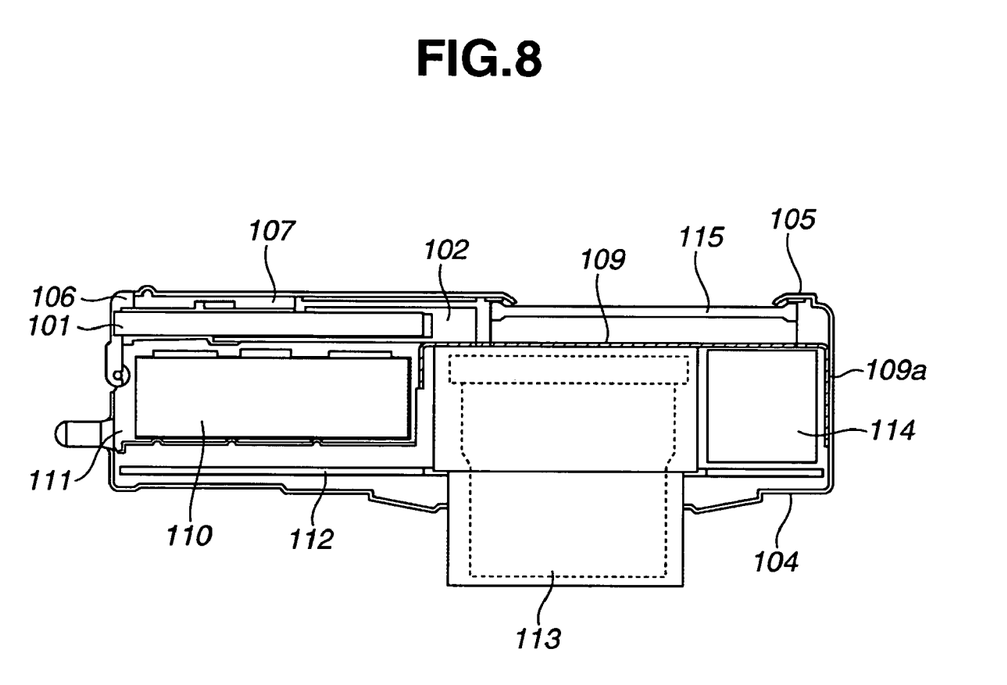
FIG. 8 is a schematic cross-sectional view illustrating the conventional digital camera shown in FIG. 7.

Next, the internal structure of the conventional camera will be described with reference to a schematic cross-sectional view shown in FIG. 8.

A main chassis 109 serves as the internal structure of the conventional camera, and is made of a thin steel plate in order to reduce the size and weight of the camera. FIG. 8 also illustrates a battery 110, a battery chamber 111 for accommodating the battery 110, a signal processing substrate 112, a barrel 113 incorporating a solid-state image pickup device and a lens (collectively shown in phantom), a power supply circuit unit 114, and an image display unit 115.

The main chassis 109 has a substantially cornered-U-shape, with a bent portion 109a that contacts the front cover 104 and the rear cover 105. The battery chamber 111 is fixed on the main chassis 109 by conventional fixing means (not shown), and contacts the front cover 104 and the rear cover 105. The CF-card slot 102, serving as an accommodating unit for the CF card 101, is disposed in a space formed by the main chassis 109, and the rear inner member 107 boded to the rear cover 105 (for example, refer to patent literature 1).

Figure 9:
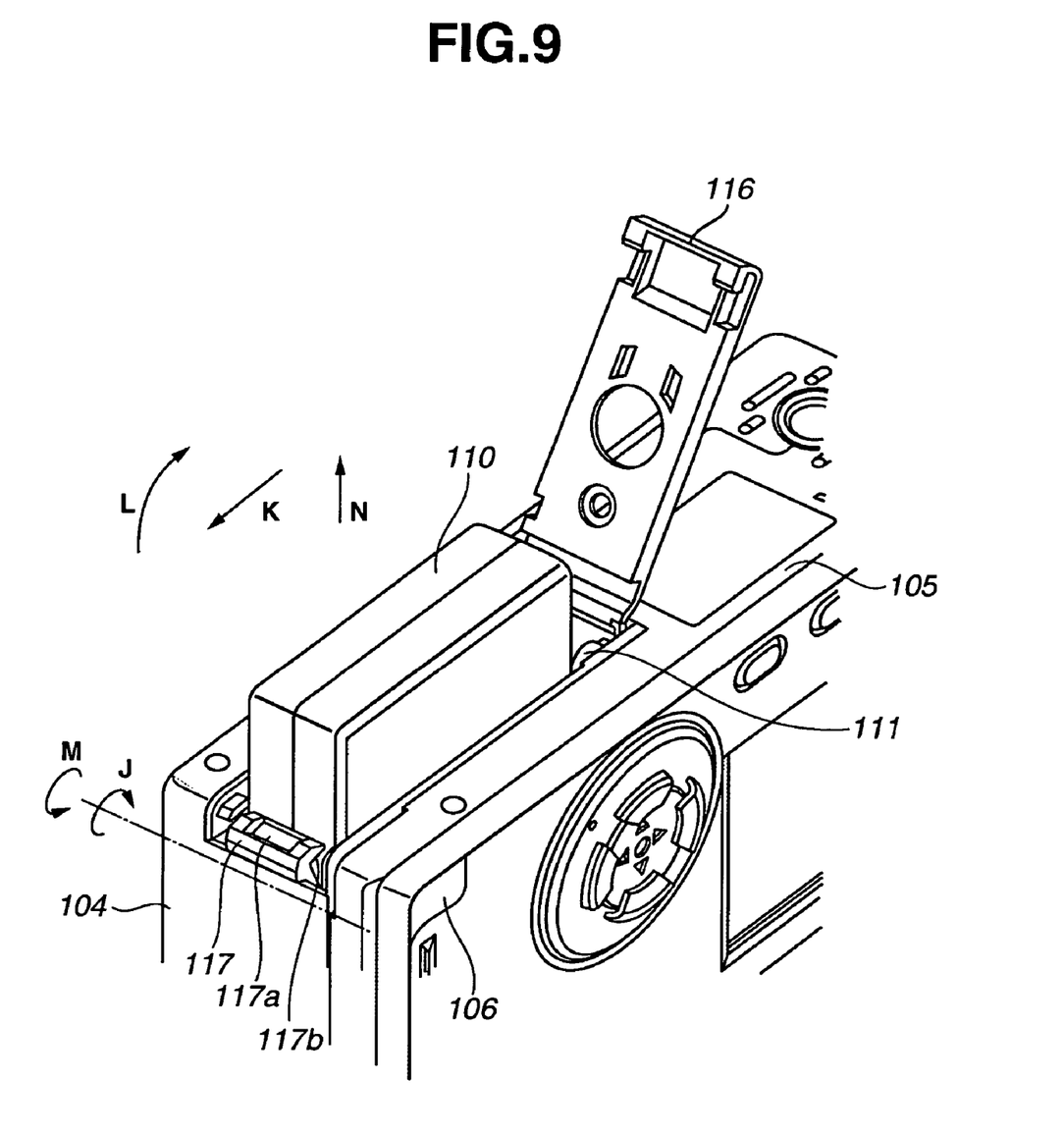
FIG. 9 is a schematic perspective view illustrating a state of a battery accommodating unit of the conventional digital camera shown in FIG. 7.

Next, a conventional battery lock and battery chamber lid will be described with reference to FIG. 9. FIG. 9 is a schematic perspective view illustrating a portion near the battery chamber lid.

In FIG. 9, there are shown a battery chamber lid 116, and a battery lock 117 having an L-shaped pawl 117b at a distal end thereof. The battery lock 117 is rotatably supported on a shaft (not shown), and is biased by the urging force of an urging spring (not shown) so as to be rotatable in the direction of an arrow J. When the battery 110 is accommodated in the battery chamber 111, the distal end (pawl 117b) of the battery lock 117 rotates so as to cover the battery 110 by the urging spring, thereby to prevent the battery 110 from exiting the battery chamber 111. FIG. 9 illustrates a state in which the battery chamber lid 116 is open. The battery chamber lid 116 is rotated from a closed state to this opened state by first sliding the battery chamber lid 116 in the direction of an arrow K that is orthogonal to a battery insertion direction, and then rotating the battery lid 116 in the direction of an arrow L so that a travel of the distal end of the battery chamber lid 116 depicts an arc. The battery 110 then can be taken out in the direction of an arrow N, e.g., by means of a discharge spring (not shown) provided in the battery chamber 111, by manually engaging a recess 117a of the battery lock 117 so as to rotate it in the direction of an arrow M, against the elastic biasing force of the urging spring in the direction of the arrow J, thereby detaching the pawl 117b from the battery 110.

Figure 10:
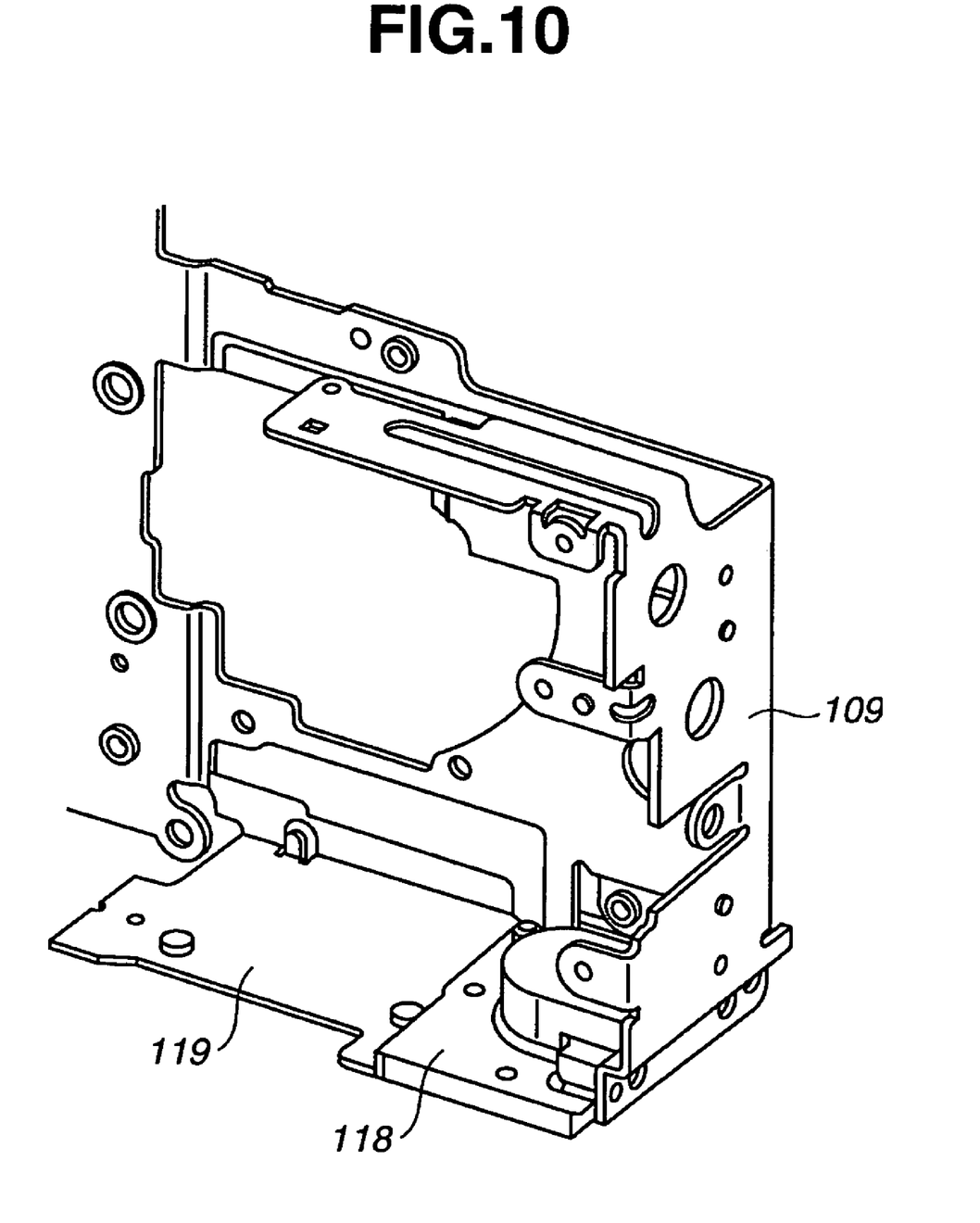
FIG. 10 is a schematic perspective view illustrating a main portion of a main chassis of the conventional digital camera shown in FIG. 7.
Figure 11:
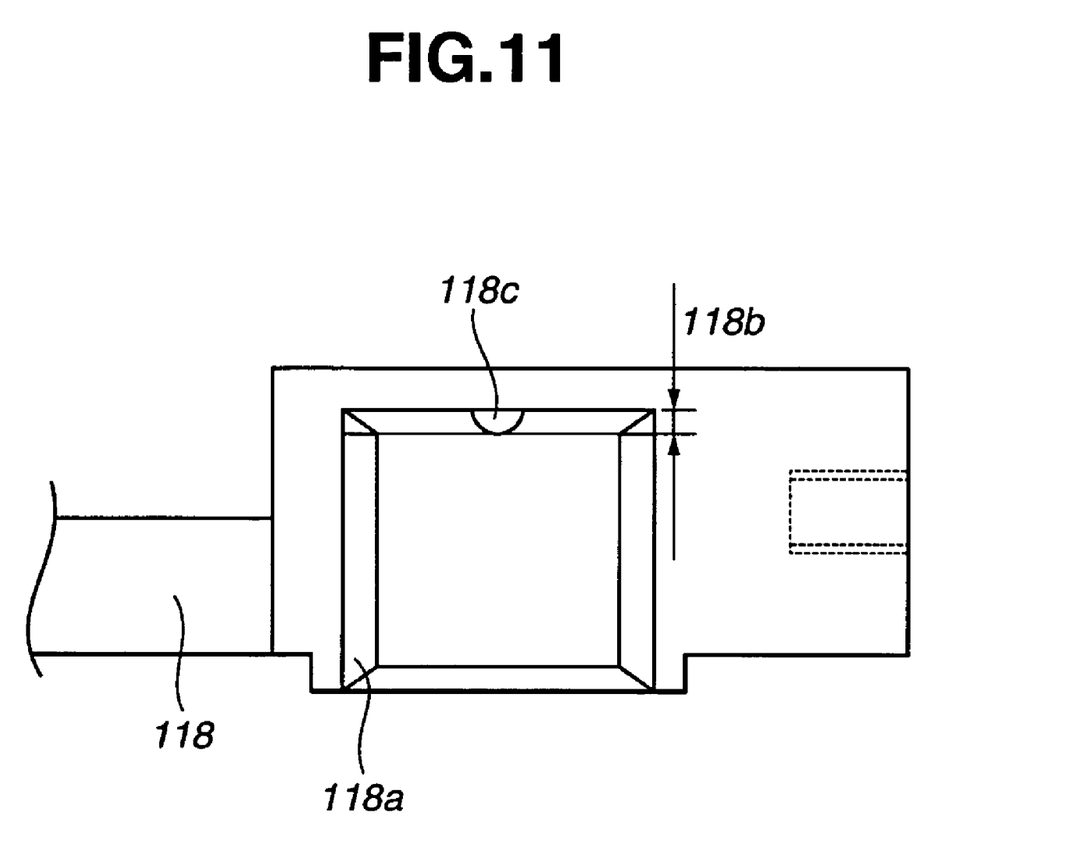
FIG. 11 is a schematic cross-sectional view illustrating a tripod screw mount of the conventional digital camera shown in FIG. 7.

Next, a tripod mount screw to be used when mounting the camera to a tripod will be described with reference to FIGS. 10 and 11.

A tripod screw mount 118 including an internal screw thread portion 118a therein is fixed to the main chassis 109 and a bottom plate 119 using screws (not shown). By fixing the front cover 104 and the rear cover 105 (neither shown in FIGS. 10 and 11) to the tripod screw mount 118 using screws, the main body of the digital camera and the tripod screw 118 are integrated to secure rigidity that is necessary when mounting the camera to a tripod. As shown in FIG. 11, the tripod screw mount 118 includes an incomplete screw thread portion 118b in addition to the screw thread portion 118a. These portions are produced when performing tapping processing for the tripod screw mount 118 having the shape of a bag. A semispherical projection 118c having substantially the same height as the incomplete screw thread portion 118b is also included in the tripod screw mount 118.

The rigidity of the housing of the conventional digital camera having the above-described configuration is weak with regard to deflection at a central portion, and stress due to pressure on the camera from either side, because the rigid main chassis 109 and the battery chamber 111 are connected at a central portion. Since a thin steel plate is used in order to reduce the size and the weight of the camera, there is a possibility that the camera may become deformed at a connecting portion if an excess stress is applied, resulting in destruction of internal components, such as the barrel and the like.

As for the recording-medium accommodating unit, in FIG. 7, if a stress indicated by an arrow P is applied to the rear cover 105 that is not directly supported by the main chassis 109, there is a possibility that the entirety of the rear inner member 107 may become deformed because of a cantilever structure effect in which there is no support on the main body, thereby causing a stress in the CF-card slot 102, resulting in destruction of the CF card 101.

SUMMARY OF THE INVENTION

It is an object of the present invention to provide an image pickup apparatus having a rigid housing utilizing a thin steel plate for a main chassis in order to reduce the size and the weight of the apparatus.

It is another object of the present invention to provide an image pickup apparatus having a structure capable of protecting a recording medium having important recorded images, utilizing a small and light housing.

According to one aspect of the present invention, an image pickup apparatus includes a solid-state image pickup device for converting an object image into an electrical signal, a chassis, and a protective housing member. The chassis includes a plurality of stepwise bent portions, wherein bent portions positioned at opposing ends of the chassis are fixed at respective ends of the image pickup apparatus in a state contacting the protective housing member.

According to another aspect of the present invention, an image pickup apparatus includes a solid-state image pickup device for converting an object image into an electrical signal, a recording-medium accommodating unit for accommodating a recording medium detachably mountable in a main body of the apparatus, and a battery accommodating unit for accommodating a battery operating as a power supply for the main body of the apparatus, a chassis, and an protective housing member. The chassis includes a plurality of stepwise bent portions. The bent portions positioned at opposing ends of the chassis are fixed at respective ends of the image pickup apparatus. The battery accommodating unit is fixed to the chassis. The recording-medium accommodating unit is fixed in a space surrounded by the chassis and the battery accommodating unit that is formed utilizing the stepwise bent portions of the chassis.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described with reference to the drawings.

Figure 1:
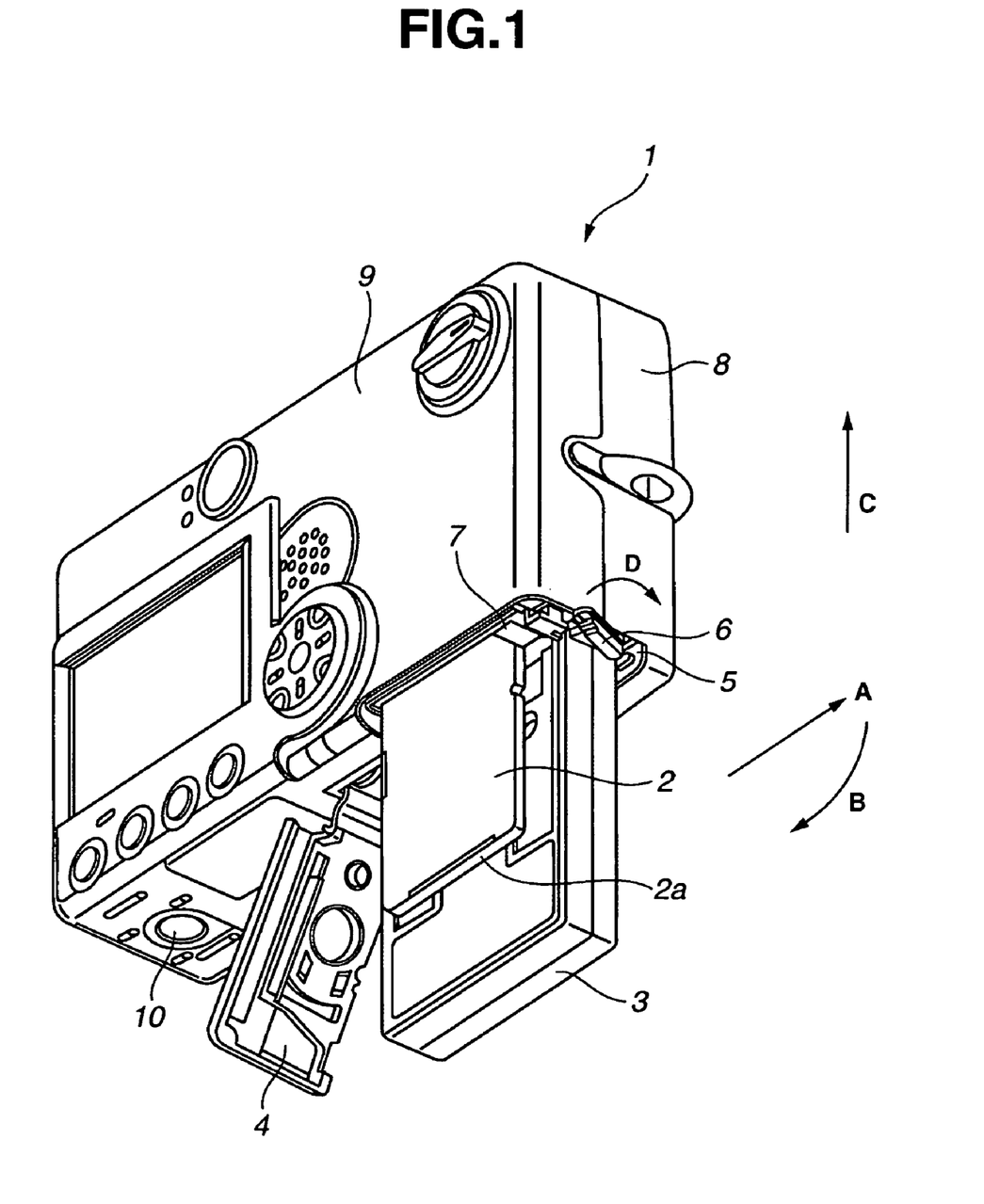
FIG. 1 is a schematic perspective view illustrating an image pickup apparatus according to an embodiment of the present invention.

FIG. 1 is a schematic perspective view illustrating a digital camera, serving as an image pickup apparatus, according to an embodiment of the present invention. In FIG. 1, a digital camera 1, serving as an image pickup apparatus, generally includes a solid-state image pickup device, image pickup means including a lens, a signal processing unit, a power supply circuit unit, a battery accommodating unit, and recording means for recording a photographed image in a recording medium. An SD memory card (hereinafter abbreviated as an "SD card") 2 serves as a recording medium for recording data of an object image or the like converted into an electrical signal by the solid-state image pickup device. A battery 3 operates as a power supply of the digital camera. A base lid 4 serves as part of a protective housing (armor) of a digital camera for protecting the SD card 2 and the battery 3. A battery chamber 5 serves as an accommodating unit for the battery 3. An end portion of a battery lock 6 is rotatably supported at the battery chamber 5 in order to lock the battery 3 in the battery chamber 5. An SD-card slot 7 serves as an accommodating unit for the SD card 2. A front cover 8 serves as a camera-front-surface protective housing member (e.g., metal armor). A rear cover 9 serves as a camera-rear-surface protective housing member (e.g., metal armor). A tripod screw mount 10 is provided for fixing the digital camera 1 to a tripod (not shown).

The SD card 2 or the battery 3 is taken out of the camera from a state in which the SD card 2 and the battery 3 are accommodated in the SD-card slot 7 and the battery chamber 5, respectively, and the base lid 4 is closed, by first sliding the base lid 4 in the direction of an arrow A that is orthogonal to a battery insertion direction (a direction parallel to the base of the digital camera 1), and then rotating the base lid 4 in the direction of an arrow B so that movement of the distal end of the base lid 4 depicts an arc, to provide a state shown in FIG. 1. When the user desires to take out the SD card 2, an SD-card end surface 2a initially is manually pushed in the direction of an arrow C, i.e., an SD-card insertion direction. As a result, a locking action within the SD-card slot 7 is released, and the SD card 2 is then discharged by the spring bias force of a discharge spring provided in the SD-card slot 7. When an SD card 2 is to be inserted into the camera, the SD-card end surface 2a is manually pushed in the direction of arrow C, operating a locking action in the SD-card slot 7 operates, and the SD card 2 is held within the SD-card slot 7 (this insert-eject operation is termed a "push-push method"). When the user desires to take out the battery 3, the battery lock 6 locking the battery 3 in the battery chamber 5, by covering the battery 3 is rotated in the direction of an arrow D, and the battery 3 is discharged by the spring bias force of a discharge spring (not shown) within the battery chamber 5.

Figure 2:
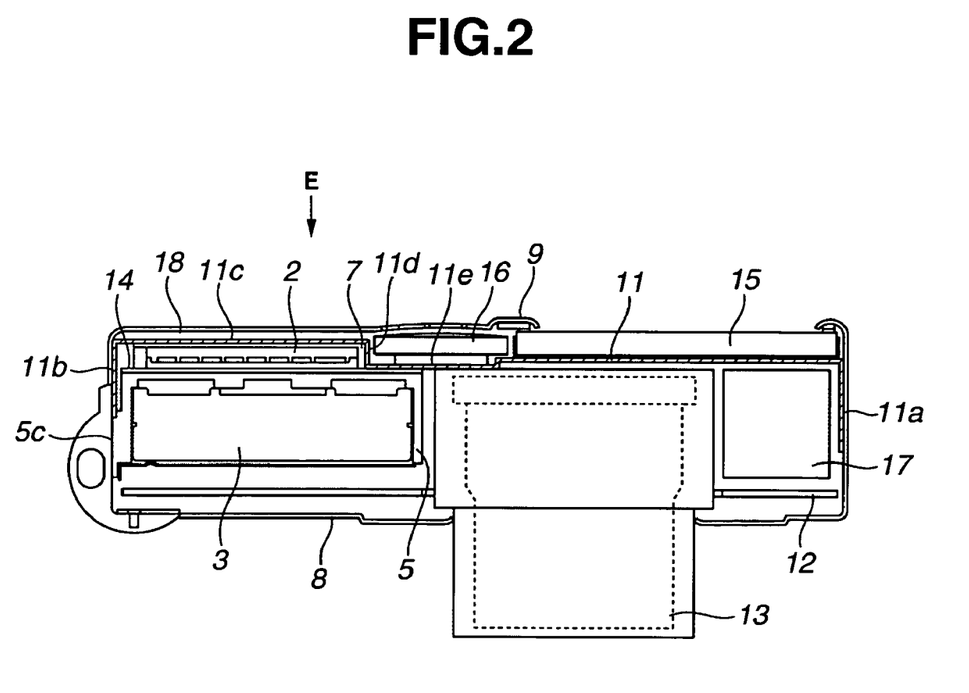
FIG. 2 is a schematic cross-sectional view illustrating the image pickup apparatus shown in FIG. 1.

Next, the rigidity of the housing will be described with reference to FIG. 2. FIG. 2 is a schematic cross-sectional view of the digital camera as seen from above in a direction substantially parallel to the optical axis. In FIG. 2, a main chassis 11 serves as the internal structure of the camera, and is made of a thin steel plate in order to reduce the size and weight of the camera. There are also shown a signal processing substrate 12, a barrel 13 incorporating a solid-state image pickup device and a lens (collectively shown in phantom), a power supply circuit substrate 14 on which the SD-card slot 7 is mounted, a liquid-crystal panel 15, serving as an image display unit, a speaker 16 used for providing an operation sound, such as a shutter sound or the like, and reproducing voice, a barrel driving circuit unit 17, and a rear inner member 18, made of resin, bonded to the rear cover 9.

As shown in FIG. 2, the main chassis 11 has three cornered-U-shaped stepwise bent portions. Bent portions 11*a* and 11*b* positioned at opposing ends of the main chassis 11 are fixed to the front cover 8 and the rear cover 9 using screws (not shown). The battery chamber housing 5 is fixed to the main chassis 11 using screws (not shown), and an end surface 5*c* (see also FIG. 3) of the battery chamber housing 5 is fixed to the front cover 8 and the rear cover 9 using screws (not shown). By providing a three cornered-U-shaped bent portion structure, the strength of the chassis 11 is improved even if it is made of a thin plate. Furthermore, since both ends of the chassis 11 are fixedly supported by the protective housing (armor), a structure that is strong against deflection at a central portion, and stress due to pressure on the camera from the sides is obtained.

The SD-card slot housing 7, serving as an accommodating unit for the SD card 2, is soldered on the power supply circuit substrate 14. The power supply circuit substrate 14 is soldered to a battery contact piece (not shown) of the battery chamber housing 5, and also is screwed to the battery chamber housing 5. Since the battery chamber housing 5 is fixed to the main chassis 11, and the SD-card slot housing 7 is fixed to the battery chamber housing 5 via the power supply circuit substrate 14, the SD-card slot housing 7 is securely fixed.

A power supply GND pattern (a pattern where a battery contact piece (not shown) contacting a GND terminal of the battery 3 is soldered) provided on the power supply circuit substrate 14 is electrically connected to the main chassis 11 at a bent portion lie. As a result, the main chassis 11, the front cover 8 and the rear cover 9 have a GND potential, so that improvement of a static-electricity resistant property, reduction of unnecessary radiation noise, and improvement of a shielding effect for external electromagnetic radiation can be realized.

Substantially cornered-U-shaped portions 11*b*, 11*c* and 11*d* of the main chassis 11, which is fixed to the battery chamber housing 5, are disposed around the SD-card slot housing 7. Accordingly, the SD card 2 having important recorded images can be protected against mechanical stresses, such as an unexpected external pressure in the direction of an arrow E, and the like, and electric stresses, such as static electricity, and the like.

By placing the speaker 16 in a space provided between the liquid-crystal panel 15 and the SD-card slot housing 7, it is possible to realize effective space utilization, and a small and light digital camera having reduced dead space and large rigidity even if a thin plate main chassis is used.

As described above, in the configuration shown in FIG. 2, by fixing the main chassis 11 having cornered-U-shaped bent portions in a state of contacting both lateral ends of the digital camera, the digital camera is strong against deflection at a central portion, and against stress due to pressure on the camera from both sides. Furthermore, by surrounding the accommodating unit for the SD card 2 with the main chassis 11 and the SD-card slot housing 7, it is possible to protect the SD card 2 against external stress. In addition, since the main chassis 11 is bent so as to surround the SD card 2 and the speaker 16, unused (useless) space is not produced within the digital camera, and it is possible to provide a small digital camera without degrading rigidity.

Figure 3:
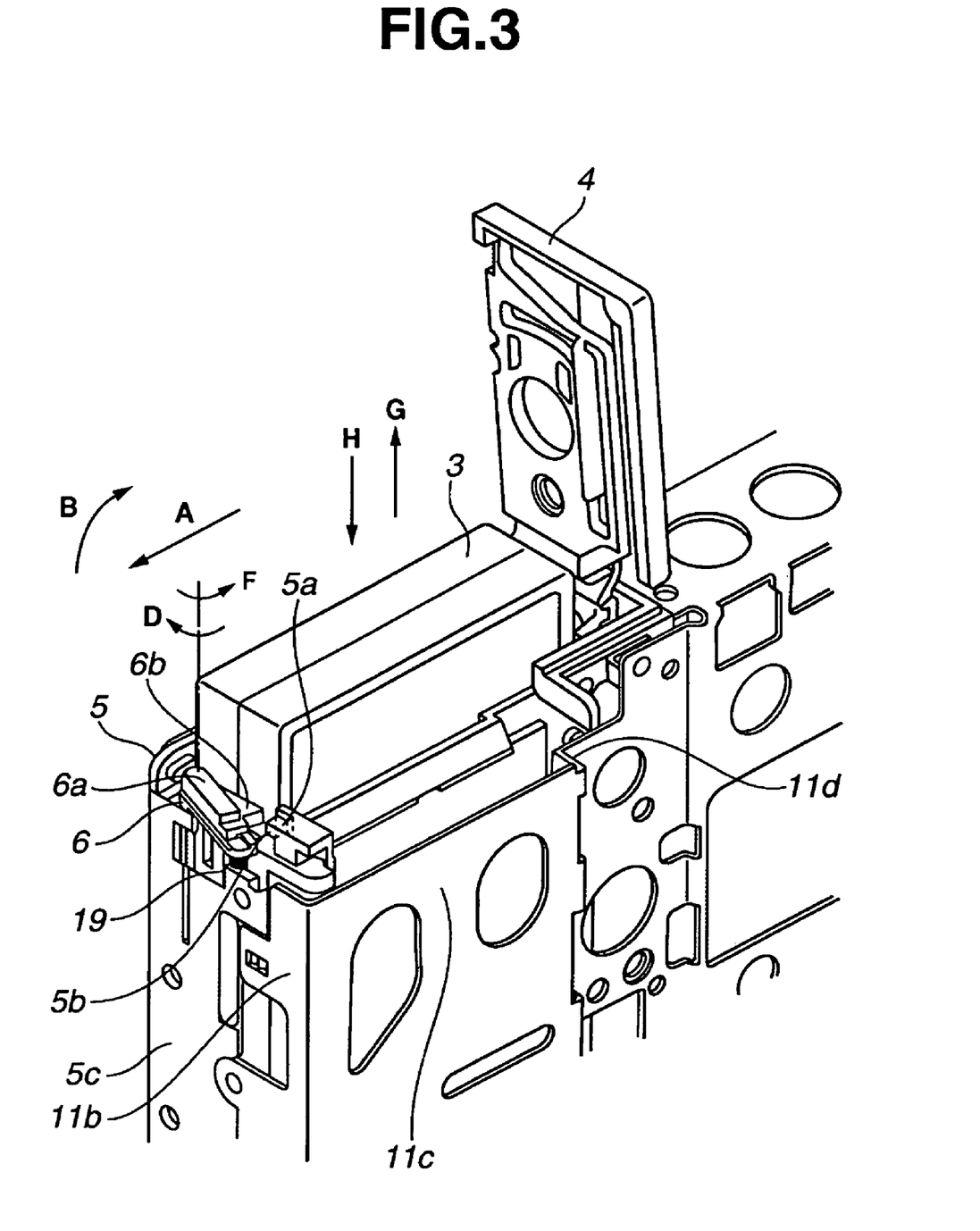
FIG. 3 is a schematic perspective view illustrating a state of a battery accommodating unit of the image pickup apparatus shown in FIG. 1.

Next, the configuration of the battery lock 6 and the base lid 4 will be described with reference to FIG. 3. FIG. 3 is a schematic perspective view illustrating the digital camera as seen from the base of the camera by removing the front cover and the rear cover, each serving as protective housing (armor). As described above, the circumference of the SD-card slot 7 is protected by the bent portions 11*b*, 11*c* and lid of the main chassis 11. In FIG. 3, the base lid 4 is open. This state is obtained from a closed state by first sliding the base lid 4 in the direction of an arrow A, and then rotating the base lid 4 in the direction of an arrow B, as described above. When the user desires to take out the battery 3, a pawl 6*b* is detached from the battery 3 by rotating the pawl 6*b* in the direction of an arrow D against the bias force of an urging spring 19 by catching a projection 6*a* of the battery lock 6 that is rotatably supported at the battery chamber 5 by a shaft (not shown) and urged in the direction of an arrow F so that the pawl 6*b* covers the battery 3 due to the bias force of the urging spring 19. As a result, the battery 3 may be slid out of the main body of the camera (in the direction of an arrow G) by a discharge spring (not shown) provided at the battery chamber 5, and can be taken out.

Conventional digital cameras have a drawback in that, if the operator erroneously drops the camera, the base lid may undesirable open so as to discharge the battery, etc., or otherwise damage the camera. This embodiment overcomes this drawback by preventing such action according to the following approach.

Figure 4:
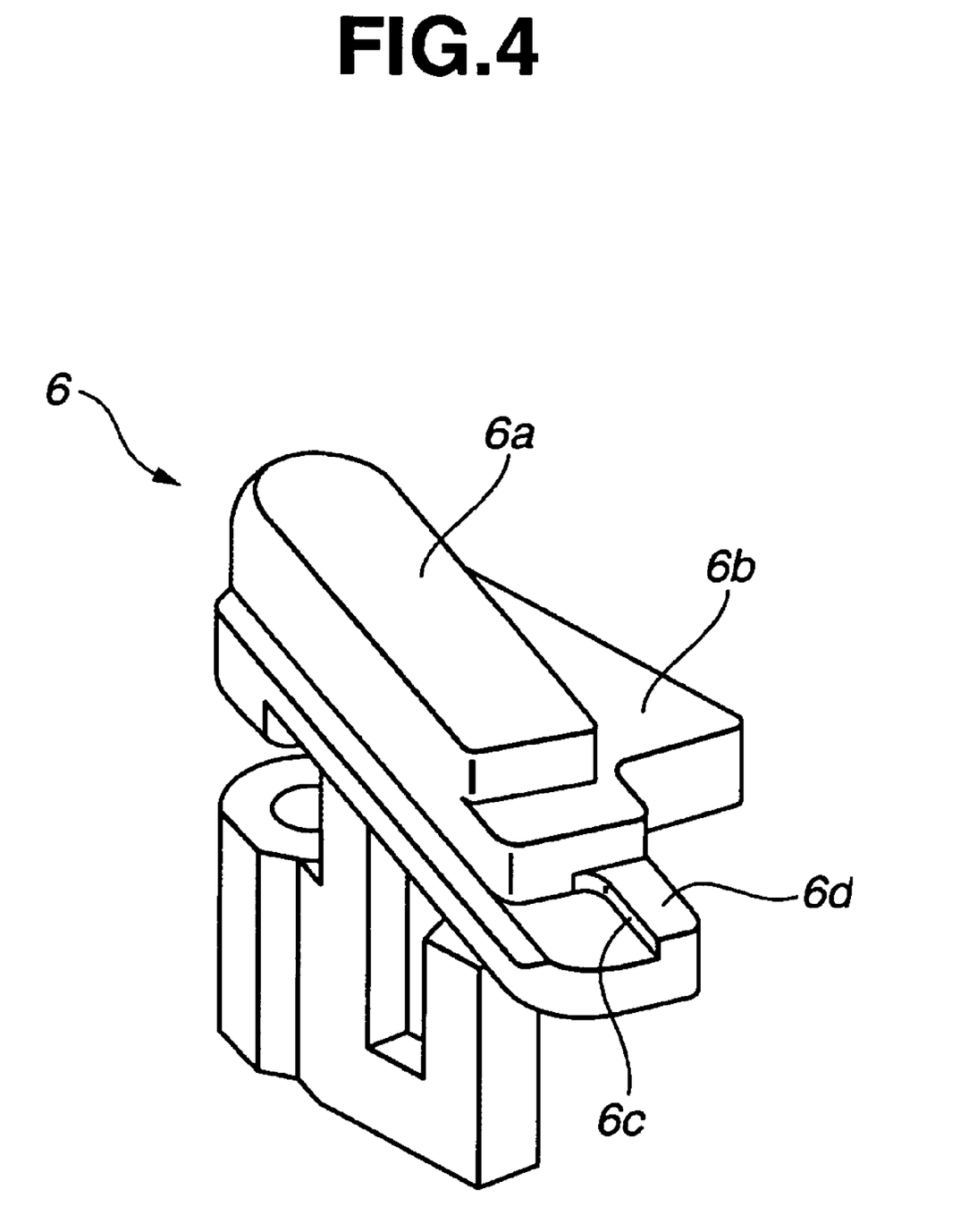
FIG. 4 is a schematic perspective view illustrating a battery lock of the image pickup apparatus shown in FIG. 1.
Figure 5:
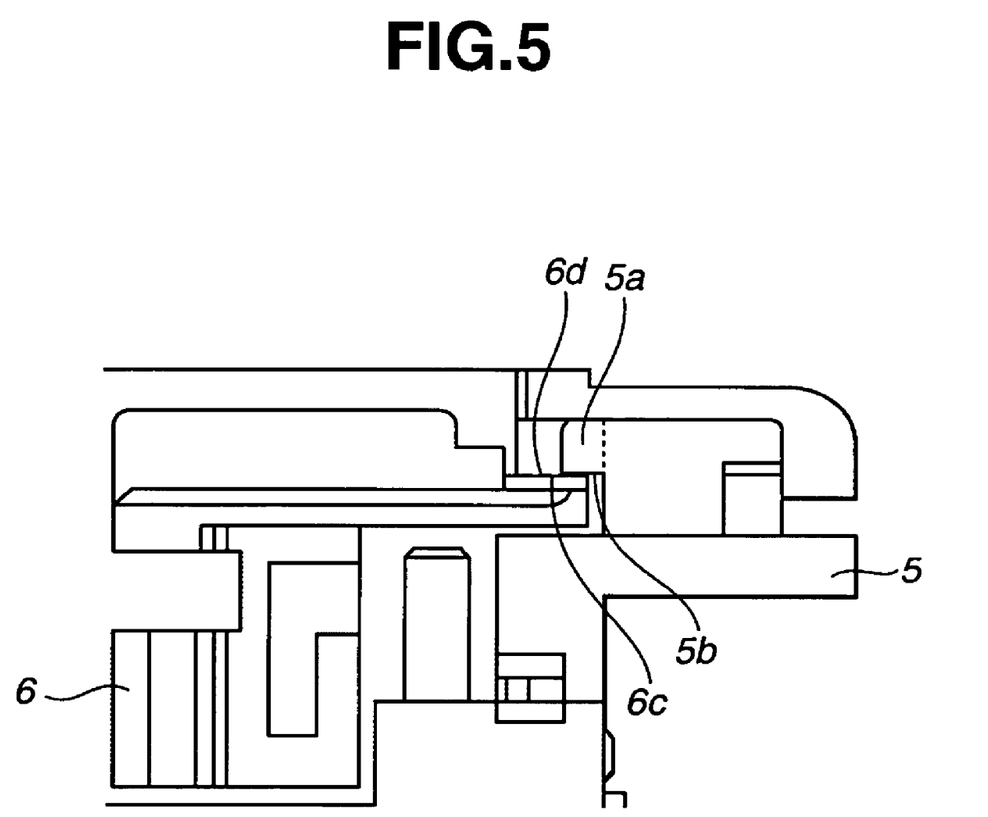
FIG. 5 is a schematic cross-sectional view illustrating the battery lock shown in FIG. 4.

As shown in FIGS. 4 and 5, a stepwise shape 6*c* having a step in the direction of arrow G (see FIG. 3), i.e., the direction the battery 3 is taken out, is provided at the battery lock 6. When a shock is applied to the digital camera and the battery 3 tends to move in the direction of arrow G, i.e., the direction the battery 3 is taken out, from an accommodated position, the pawl 6*b* contacting the battery 3 is raised in the direction of arrow G. Since the battery lock 6 is made of an elastic resin and is substantially L-shaped, it bends in the direction of arrow G. As a result, as shown in FIG. 5, the stepwise shape 6*c* is positioned so as to be superposed with the end surface 5*a* of the battery chamber 5 that is substantially parallel to the direction of arrow G. In the absence of any shock applied to the battery 3, there is a small gap in the direction of rotation of the battery lock 6 between the stepwise shape 6*c* of the battery lock 6 and the end surface 5*a* of the battery chamber 5 because the battery lock 6 is urged by the urging spring. When a shock is applied to the digital camera and the battery lock 6 tends to rotate in the direction of arrow G, i.e., a direction that releases the lock 6, by a component force of the shock. However, after the battery lock 6 slightly rotates, further rotation is suppressed by contact of the stepwise shape 6*c* of the battery lock 6 with the end surface 5*a* of the battery chamber 5. Since the amount of rotation of the battery lock 6 is very small, the base lid 4 does not slide in the direction of arrow A as a result of the rotation. According to such a configuration, the base lid 4 can not be unexpectedly opened even if shock is caused by dropping the camera.

In ordinary use (in the absence of shock), since bending of the battery lock 6 due to the battery 3 is absent, there is a gap of about 0.2 mm between the end surface 5*b* of the battery chamber 5 and an end surface 6*d* of the battery lock 6. In other words, the stepwise shape 6*c* and the end surface 5*a* of the battery chamber 5 do not interfere with each other in ordinary use, and the battery lock 6 does not contact the end surface 5*b* of the battery chamber 5 even if the battery lock 6 rotates in this state. When the operator rotates the battery lock 6 in the direction of arrow D, against the bias force of the urging spring 19, by manually engaging the projection 6a of the battery lock 6 in order to discharge the battery 3, the battery lock 6 bends due to application of a component force in the direction of an arrow H, i.e., a direction of insertion of the battery 3, the gap of 0.2 mm between the end surfaces 5b and 6d further increases, so that the battery lock 6 can smoothly rotate in the direction of arrow D without interfering with the battery chamber 5.

As described above, in this embodiment, when the user desires to take out the battery 3 in an ordinary state, the battery lock 6 rotates without causing any problem. When the digital camera is unexpectedly dropped, rotation of the battery lock 6 is prohibited by engagement with the battery chamber 5, so that the base lid 4 does not open. As a result, it is possible to prevent an undesirable case in which the camera cannot be operated because the battery is broken.

Figure 6:
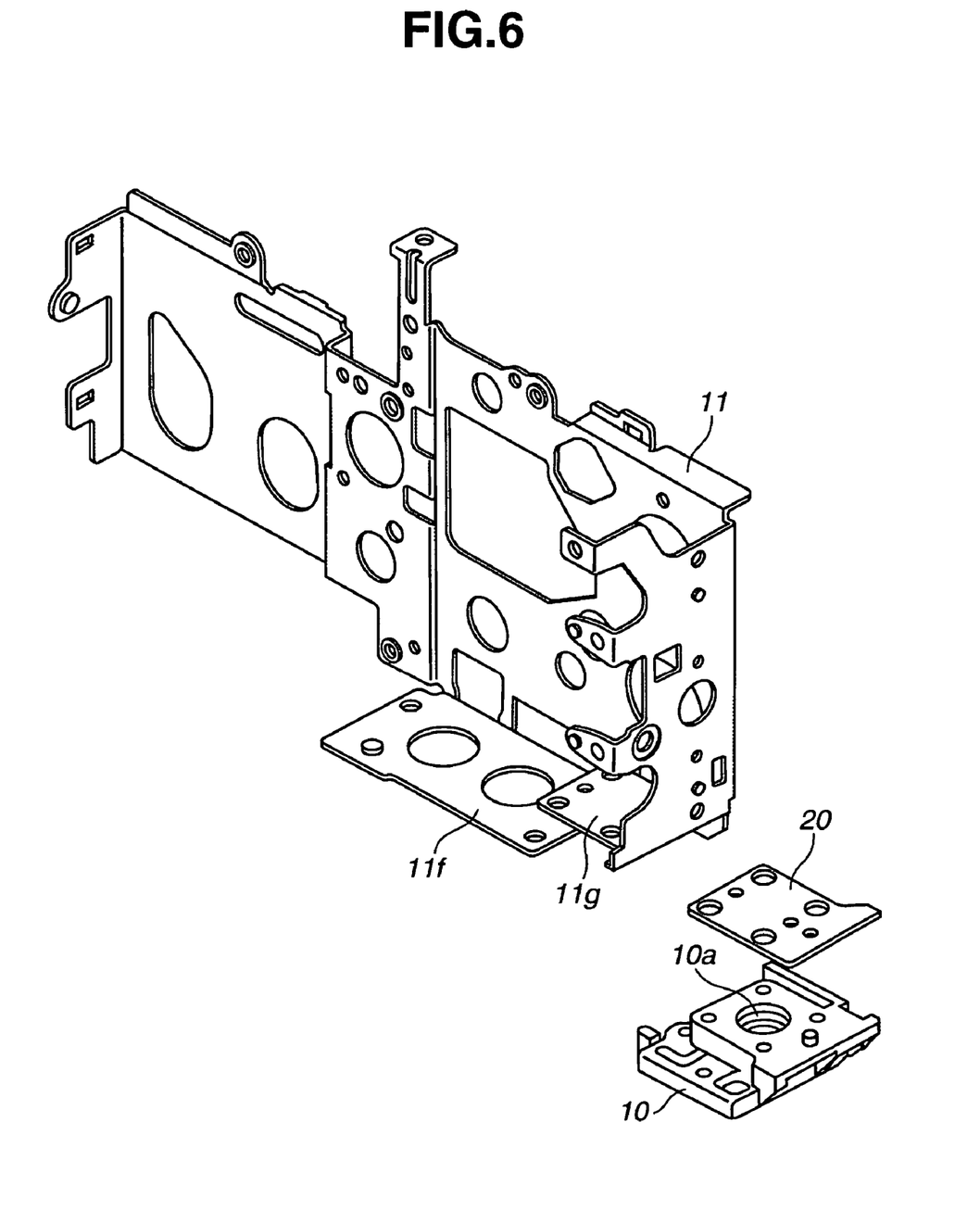
FIG. 6 is a schematic perspective view illustrating a main chassis of the image pickup apparatus shown in FIG. 1.

Next, a tripod screw mount will be described with reference to FIG. 6. FIG. 6 is a schematic perspective view illustrating the configuration of a tripod screw mount. In FIG. 6, a tripod screw mount 10 is fixed to a bent portion 11f of the main chassis 11 using screws (not shown), and is also fixed to a bent portion 11g of the main chassis 11 using screws (not shown) via a top plate 20. The tripod screw mount 10 has a threaded screw portion 10a at a substantially central portion, where a tripod is to be mounted. A large strength is required for a portion to contact a tripod. This is because in some tripods for high-level amateurs or the like, the operator can freely adjust the length of a screw portion to a value other than a standard length, and it is therefore necessary to secure a sufficient strength so as not to cause deformation even if the operator erroneously mounts the tripod to the camera in a state in which the screw portion is abnormally long. If the contact portion of the tripod screw mount 10 is deformed, there is the possibility that some components within the camera may be damaged, resulting in incapability of operating the camera. In this embodiment, an experiment has proven that a large strength can be obtained by using a zinc-plated steel plate (0.5 mm thick) and an SUS (stainless steel) material (0.6 mm thick) having substantially the same shape as the portion 11g of the main chassis 11 for the main chassis 11 and the top plate 20, screwing together the steel plate and the SUS material using four screws, respectively, and fixing the tripod screw mount 10 on two surfaces of the main chassis 11. If it is desired to omit the top plate 20 in order to reduce the cost, and to secure a sufficient contact strength with a tripod using only the main chassis 11, a simple calculation indicates that the thickness of the main chassis 11 must be 1.1 mm. Since the SUS material has a larger mechanical strength, a thickness greater than 1.1 mm is actually required, resulting in an increase in the size and weight of the overall main chassis 11. This is contradictory to reduction in the size of the camera.

If the top surface of the screw portion is made of a zinc-plated steel plate, appearance is inferior, and there is the possibility that rust may be produced due to aging deterioration if a pinhole is present. Accordingly, if an SUS material is used for a necessary portion, i.e., the top plate portion in this embodiment, a configuration having an excellent external appearance and a large strength is obtained. Furthermore, in this embodiment, since the screw portion is a threaded hole, tapping processing and cutting-off processing can be performed, resulting in large reduction in the processing tact time and the production cost. According to cutting-off processing, the entirety of the screw portion is a complete screw portion. Hence, a projection for preventing entrance of a tripod in an incomplete screw portion that is conventionally necessary becomes unnecessary, resulting in reduction of the total height of the tripod screw mount 10. As a result, the space within the camera is larger than in a conventional camera, and the overall digital camera can incorporate many functions, although the size of the camera is small.

As described above, according to the present invention, it is possible to provide a very rigid image pickup apparatus even if a thin steel plate is used for a main chassis.

It is also possible to provide an image pickup apparatus that protects a recording medium having important recorded images even if a small and light housing is used.

The individual components shown in outline in the drawings are all well known in the image pickup apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
a lens barrel;
an image pickup device for converting an object image into an electrical signal;
an image display unit;
an exterior member comprising front and rear covers, each extending from a first side to a second side of the apparatus; and
a chassis being disposed at least between said lens barrel and said image display unit, extending from the first side to the second side of the apparatus,
wherein said chassis comprises first bent portions positioned at opposing ends of said chassis, fixed to the front and rear covers of the exterior member by a plurality of fixing members formed on the first bent portions in order to fix said chassis to said exterior member, and a second bent portion formed between the first bent portions, and
wherein said second bent portion is formed in an area other than an area between said lens barrel and said image display unit.

2. An image pickup apparatus according to claim 1, further comprising a recording-medium accommodating unit, wherein said recording-medium accommodating unit is located in a space formed between one of the first bent portions and the second bent portion.

3. An image pickup apparatus according to claim 2, wherein said recording-medium accommodating unit is covered by a covered portion which is located between one of the first bent portions and the second bent portion of said chassis and is facing said exterior member.

4. An image pickup apparatus according to claim 2, further comprising a battery accommodating unit, wherein said recording-medium accommodating unit is fixed to said battery accommodating unit.

* * * * *